United States Patent

Littauer

[11] 3,880,721
[45] Apr. 29, 1975

[54] METHOD FOR REDUCING (PSEUDO-) OHMIC OVERPOTENTIAL AT GAS-EVOLVING ELECTRODES

[75] Inventor: Ernest L. Littauer, Hollywood, Calif.

[73] Assignee: Lockheed Aircraft Corporation, Burbank, Calif.

[22] Filed: Mar. 2, 1972

[21] Appl. No.: 231,240

[52] U.S. Cl............... 204/1 R; 204/147; 204/196; 204/286; 204/288; 204/290 F
[51] Int. Cl............................................. B01k 3/00
[58] Field of Search ........ 204/288, 286, 290 F, 1 R, 204/147, 196

[56] References Cited
UNITED STATES PATENTS
2,795,541  6/1957  Muller............................. 204/290 F
3,313,721  4/1967  Teel................................ 204/290 F

*Primary Examiner*—F. C. Edmundson
*Attorney, Agent, or Firm*—Billy G. Corber; Albert K. Geer

[57] ABSTRACT

A method for reducing overpotential at gas-evolving electrodes wherein the electrodes are in the form of fine wires having a diameter of from 2 to 10 thousandths of an inch and are spaced about .18 to .30 inch from each other.

6 Claims, 5 Drawing Figures

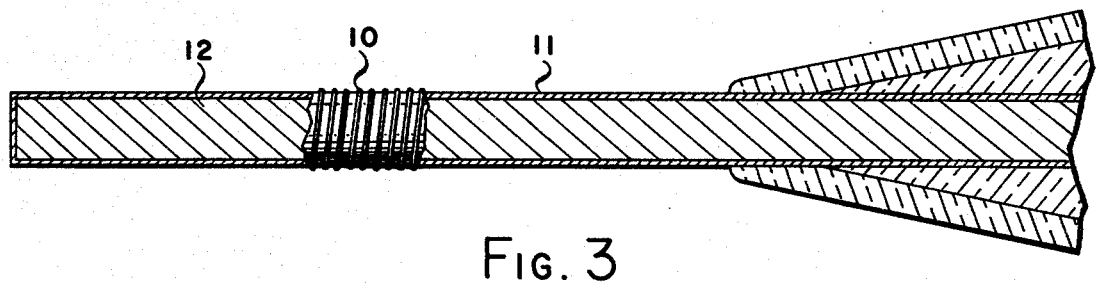
Fig. 3
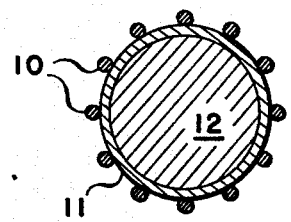
Fig. 4
Fig. 5
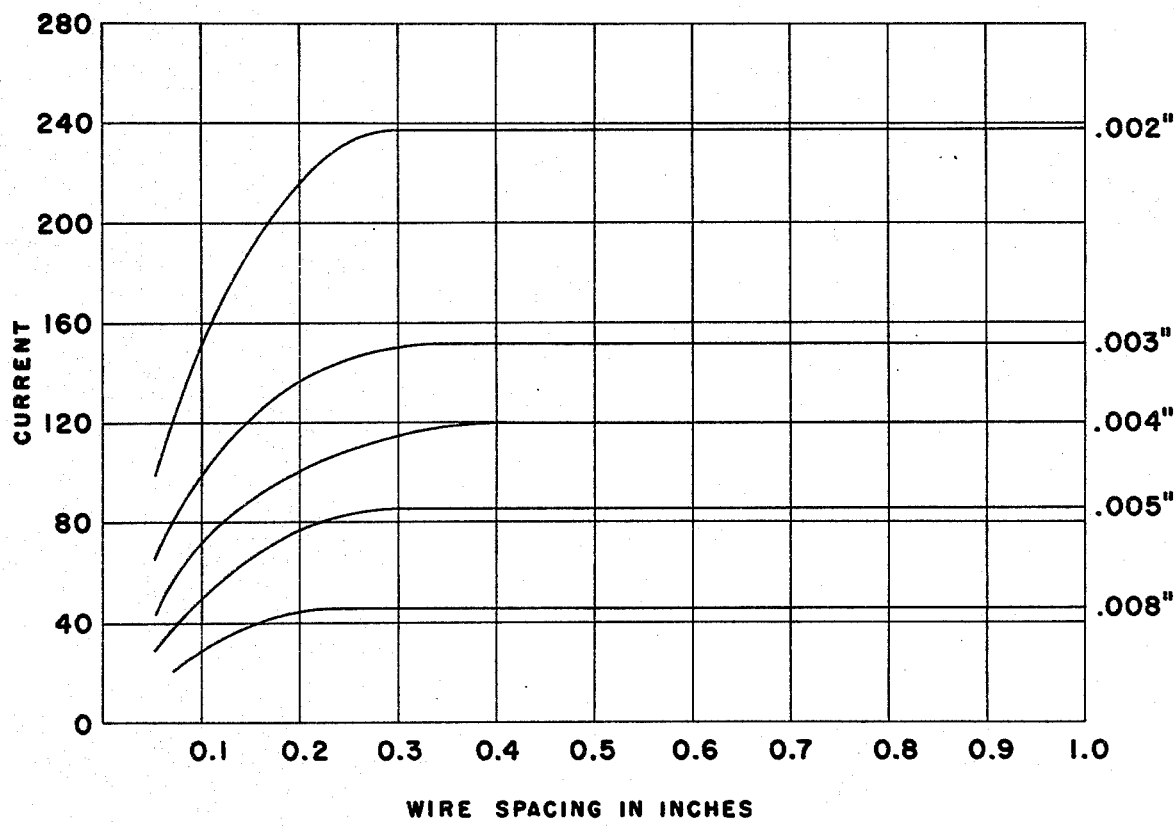

METHOD FOR REDUCING (PSEUDO-) OHMIC OVERPOTENTIAL AT GAS-EVOLVING ELECTRODES

The present invention relates to electrolytic systems and more particularly to a method for reducing ohmic overpotential at gas-evolving electrodes in such systems.

In prior systems, electrodes were made of rods or plates, comprising either solid working material, or working material electroplated, welded or shrunk onto an inert substrate, e.g., platinum cylinders fixed to tantalum rod substrate.

It is desirable that electrodes used for electrochemical production, electroplating, cathodic protection, etc. should operate with as small a driving voltage as possible. This is because the current performs the required Faradaic function and the driving voltage becomes an effector of power costs. As the electroplaters would put it, voltage becomes the item of cost, while current brings in the money.

Typical uses of electrodes are: (1) electrochemical gas production from aqueous systems, e.g., hydrogen at a cathode; oxygen, chlorine or other gases at the anode; (2) electroplating, where gases are incidentally evolved at the anodes; (3) electrochemical protection in aqueous solutions: (a) cathodic protection — may use permanent anodes, in which case oxygen and chlorine are evolved and (b) anodic protection — uses a cathode at which hydrogen is evolved.

The voltage needed to drive an electrode is that needed to overcome the sum of the resistances of the entire path between the anode and cathode, i.e., the resistance in the conductors, power supply and electrolyte path, plus polarization effects at the electrode solution interfaces. Various writers have attributed various effects to polarization voltage, such as transfer voltage, concentration effect, ohmic resistance of the products of electrolysis on or in the vicinity of the electrodes and electrode effect. Transfer voltage, if it exists, and electrode effect are not believed significant for present purposes; only the concentration effect and ohmic resistance due to the products of electrolysis will be considered.

Concentration effect results from the removal of ions from the electrolyte in the immediate vicinity of the electrode. Thus, if a solution of copper sulfate with copper electrodes is electrolyzed there will be a small difference of concentration at the electrodes. This is caused by the removal of copper at the cathode and the addition of copper at the anode. The current must supply the energy for transportation of copper and thus a higher voltage is needed. This polarization voltage is proportional to concentration change, but except for high current densities is usually not large.

The products of electrolysis, particularly where a gas is liberated at one or more of the electrodes, require additional voltage to force current through the cell. Some believe that a thin film of the gas is formed over the entire surface of the electrode, and as a good insulator it creates a substantial resistance to the passage of current. However, if the film exists or not, bubbles are formed and their size before detachment from the electrode is related to surface tension, contact angle, hydrostatic lift and the electrical field in the double layer. On detachment, they escape from the electrolyte. As the gas is freed, the electrolyte is pushed back from the electrode, resulting in considerably less than 100 percent electrolyte being exposed to the passing current, causing an increase in resistance. The bubbles themselves before detachment obstruct the electrolytic path, likewise causing an increase in resistance.

Overpotential, or overvoltage, is used by most writers as another name for polarization effects, and is so used herein. By selecting the electrode material depending on the gas being produced, the electrode effect can be kept to a minimum. Thus, the main components of overpotential at higher current densities will be the concentration effect and the ohmic resistance due to the gas film and bubbles, sometimes described as pseudo-ohmic overpotential on or near the electrode.

Accordingly, a primary object of this invention is to reduce the overpotential to permit currents of higher densities.

A further object of the invention is to provide an increase in current densities without an increase in the voltage.

These and other objects and advantages will become apparent from the following description when taken with the accompanying drawings, in which:

FIG. 3 is a cross-section in elevation of a second embodiment of the invention;

FIG. 4 is a cross-section in elevation of a third embodiment of the invention; and FIG. 5 is a set of curves showing the relation between the current and the spacing of the wires on the substrate.

Figure 1:
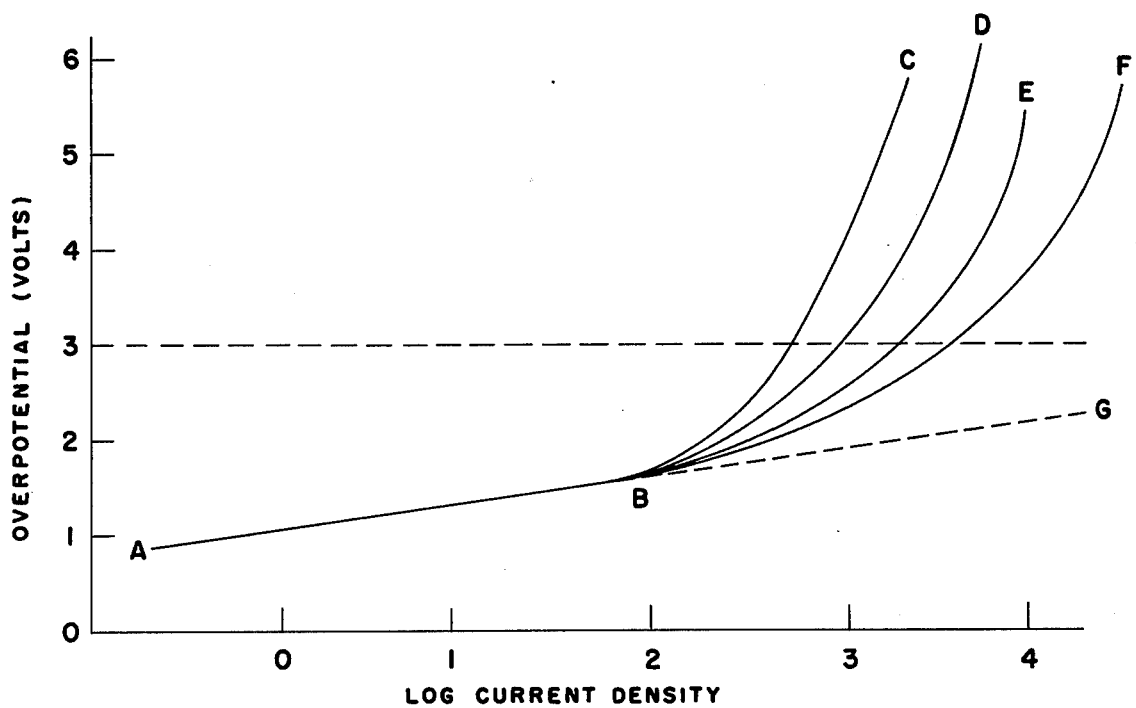
FIG. 1 is a set of curves showing the relation between the electrode potential and the current density.

When a charge exchange is impressed at an electrode in an electrolytic solution, a number of phenomena occur, as previously explained, which have the effect of increasing the potential measured at the electrode/electrolyte interface. This is depicted in FIG. 1, where point A represents the rest potential of an electrode prior to passage of charge. As current is passed, the potential increases linearly with the logarithm of the current to point B, the linear portion representing conditions under which the Tafel law of activation overpotential is obeyed. This law may be represented by the equation $\eta = a + b \log i$ wherein $\eta$ is the activation overpotential (i.e., the value of the measured potential minus potential A), $i$ is the current density and a and b are constants. In the absence of any interferences, the curve would continue linearly as ABG. However, overpotential, as previously discussed, composed mainly of the concentration effect and ohmic resistance, has the effect of causing the potential-log current density curve to deviate from linearity.

In order that ionic discharge may continue at any electrode, there must be replacement of ions removed from the electrolyte in the immediate vicinity of the electrode. Ions to replenish those already discharged are brought to the electrode surface by: (a) ionic migration due to the electric field, (b) diffusion, (c) agitation of the bulk electrolyte, either mechanically or by convection. If the necessary ionic replenishment is slower than that required by the current density at the electrode, the potential increases and no longer follows the activation relationship solely, as depicted by ABG, but deviates as shown typically by curve ABD, which may represent a homogeneous reaction involving oxidation or reduction of a species without evolution of a gas, such as in electroplating a metal at a cathode. Stirring or heating the solution will increase the rate at which ions are brought to the surface, and this will have the effect of moving the curve to the right as is shown by curve ABE. At gas-evolving electrodes, the ohmic resistance due to the gas film and bubbles causes a further increase in overpotential. Thus, a curve which would follow ABD in the absence of a gas-evolving condition becomes ABC due to the ohmic resistance.

From a study of the behavior of gas-evolving electrodes configured in the form of wires, it has been found that with a wire diameter approximately 30 thousandths of an inch (0.030) or greater, a curve similar to one obtained with plain electrodes, e.g., ABC, will be obtained. However, as the wire diameter is reduced a curve such as ABD is obtained at say 0.020 inch, ABE at 0.010 inch and ABF at 0.005 inch. With smaller diameter wires, say down to 0.002 inch, the curves are moved farther to the right. Of course, there is a practical lower limit to the diameter of the wire, due to the difficulties in handling and spot welding to a substrate as hereinafter described.

Figure 2:
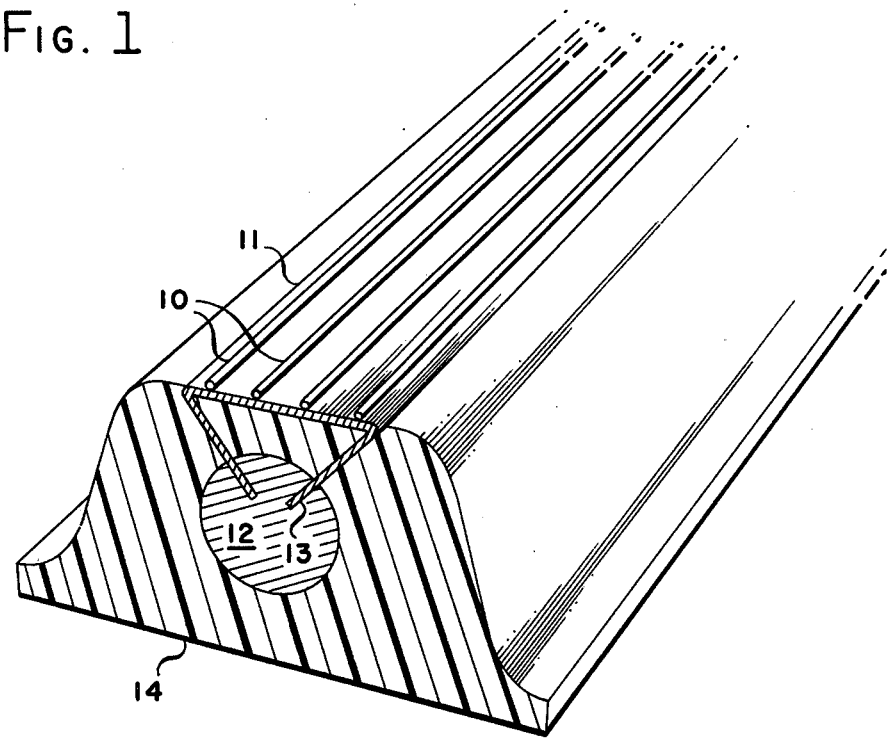
FIG. 2 is a perspective, partially in section, of a first embodiment of an electrode in accordance with the present invention.

With reference to FIG. 2, a plurality of fine wires 10 from the platinum group are spot welded to a suitable substrate 11. While other methods of attaching the wires may be used to provide a good mechanical and electrical, low resistance connection to the substrate, spot welding is preferred. The substrate is preferably niobium (columbium) foil, but may be tantalum or titanium. The platinum group preferably consists of platinum, platinized platinum and platinum alloys. The edges of the foil are connected to a low-resistance bus bar 12 by means of the slots 13. The foil may also be attached to the bus bar by means of screws or the like. Polyester resin 14 (or similar compounds), surrounds the bus bar and provides support for the foil. The configuration of the assembly is not critical. The structure shown may be utilized as an anode in a cathodic protection system. In this case, the assembly would be attached to the ship hull, the resin pad serving to protect the painted surfaces adjacent the anode.

In FIG. 3, an anode has a core 12, coated with niobium 11 and has platinum wires 10 spirally wound thereon, about 6–8 turns per inch and spot welded about every ¼ inch.

As shown in FIG. 4, the bus bar 12 may be swaged or coated with niobium (columbium) 11 (or tantalum or titanium) and the platinum wires 10 are spot-welded as before.

It has also been found that the spacing of the wires on the substrate is somewhat critical. With reference to FIG. 5, the relation of the current vs. wire spacing for different wire diameters is illustrated. It will be seen that at about 0.3 inch spacing the curves saturate and further increase in the spacing provides no benefits but is in fact a disadvantage since fewer wires can be used on a particular substrate. On the other hand, at a spacing of less than about 0.18 inch more wires can be used, and with more platinum and current, but at a high price because the wires mutually interfere with each other.

Thus, fine platinum or platinum alloy wire having a diameter in the range of 2–10 mils (0.002 to 0.010 inch) spot-welded to a 10 mil (0.010 inch) foil and spaced about 0.18 to 0.30 inch provides an electrode having a remarkably high current-low potential relationship. For example, current densities of around 2 amps/cm$^2$ at 3 to 4 volts are readily attainable. While titanium has been suggested as the substrate, niobium and tantalum are preferred since titanium is subject to pitting above about 8 volts in chloride solutions.

What is claimed is:

1. A method of reducing overpotential at gas-evolving electrodes comprising the steps of:
    a. selecting fine wires from the platinum group, having a diameter of about 0.002 to 0.010 inch,
    b. mechanically and electrically attaching said wires to a conductive substrate, said wires being spaced about 0.18 to 0.30 inch apart,
    c. connecting the substrate and wires as an electrode in an electrolyte, and
    d. passing a high density current at low voltage.

2. The method of claim 1, wherein the wires are spot welded to the substrate.

3. The method of claim 1, wherein the substrate is selected from the group of niobium, tantalum and titanium.

4. The method of claim 2, wherein the substrate is niobium.

5. The method of claim 3, wherein the platinum group wires are spirally wound on a conductive core, said wires being spot welded to the core about every ¼ inch.

6. The method of claim 3, wherein the conductive substrate is in the shape of a conductive rod and the platinum group wires are spaced longitudinally around the rod and spot welded thereto about every ¼ inch.

* * * * *